P. PALÉ.
MECHANICAL MOVEMENT.
APPLICATION FILED MAY 12, 1920.

1,378,191.

Patented May 17, 1921.

INVENTOR.
Paul Palé.
BY
ATTORNEY

UNITED STATES PATENT OFFICE.

PAUL PALÉ, OF LOS ANGELES, CALIFORNIA.

MECHANICAL MOVEMENT.

1,378,191.  Specification of Letters Patent.  Patented May 17, 1921.

Application filed May 12, 1920. Serial No. 380,756.

*To all whom it may concern:*

Be it known that I, PAUL PALÉ, a citizen of the United States, residing at Los Angeles, in the county of Los Angeles and State of California, have invented a new and useful Mechanical Movement, of which the following is a specification.

This invention relates to an improved mechanical movement for transmitting a rotary movement of a drive shaft to a driven shaft spaced therefrom and in the same direction.

The object of the invention is to provide a mechanical movement by which a rotary movement of a drive shaft is transmitted to a driven shaft at equal speed ratio, and maintaining an even distribution of transmitted power, the drive and driven shafts rotating in the same direction.

Another object is to provide a mechanism capable of performing the above stated functions and in which the use of belts, gear trains, and connecting shafts are eliminated and in which the transmitting element slides and rocks in relation to a fixed fulcrum.

Another object is to provide a lever of the first order transmitting power from a rotary drive shaft to a rotary driven shaft, and in which the effective lengths of the power and resistance ends of the lever are of constant ratio and coincidently varying lengths.

Another object is to provide a lever of the first order, slidable in relation to its fulcrum and including an internal gear formed at one end and meshing with a pinion, said gear and pinion being of a two to one ratio, the opposite end being connected to a crank pin with the radius of the crank pin movement equal to the radius of the pitch line of the pinion.

A further object is to provide a lever of the first order slidable in relation to its fixed fulcrum and connected at one end to a crank pin, the opposite end having formed therein an internal gear of true circular form, meshing with a gear pinion having a pitch diameter equal to the throw of the crank pin, the ratio of the internal gear and the gear pinion being two to one; and the speed ratio of the crank and the gear pinion being one to one.

Various other objects and advantages will be more fully apparent from the following description of the accompanying drawings which forms a part of this disclosure, and which illustrates a preferred form of embodiment of the invention.

In this description the shaft 1 will be referred to as the drive shaft and the shaft 2 as the driven shaft, although it is obvious that this relation may be reversed.

Figure 2:
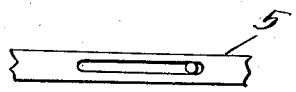
Fig. 2 is a modified form of fulcrum connection.

The drive shaft 1, journaled in suitable bearings, has a crank arm 3 provided with a crank-pin 4 and pivotally connected to the crank-pin is a power and motion transmitting lever 5. The lever is slidably retained between the rollers of a rocker carriage which comprises a roller 6 journaled on a fixed pivot 7 and two rollers 8 journaled in the opposite corners of a triangular frame 9, which frame is also journaled on the fixed pivot 7. The roller 6 serves as the fulcrum of the lever and the rollers 8 retain the lever in sliding engagement with the fulcrum roller. The form of fulcrum shown is one which has proved advantageous in use but it is to be understood that various other forms of fulcrum may be used if desired for instance, a pin and slot connection as illustrated in Fig. 2.

The opposite end of the lever 4 is formed to provide a true circular internal gear ring 10 which meshes with a gear pinion 11 fixed to the driven shaft 2, the ratio of the gear 10 and pinion 11 being two to one.

Attention is directed to the fact that the drive and the driven shafts are located at equal distances from the lever fulcrum and also that the throw of the crank-pin and the pitch diameter of the gear pinion are equal.

Figure 1:
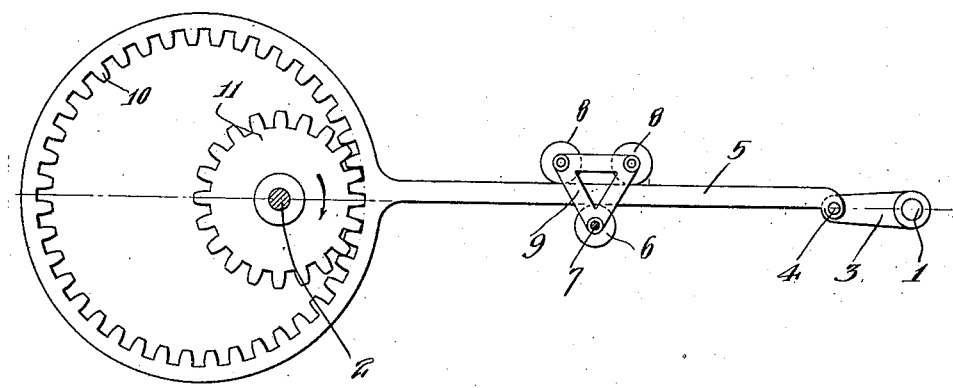
Figure 1 is a semi-diagrammatic view illustrating the movement.

In operation, when the drive shaft 1 is rotated clockwise, as indicated by the arrow, the gear pinion 11 will be rotated in the same direction at an equal speed ratio, the point of intermesh of the gear 10 with the pinion 11 traveling in a reverse direction around the pinion. This reverse travel of the point of intermesh maintains an equal ratio of the effective lengths of the power and weight ends of the lever, as a lever of the first order, and maintains an equal distribution of the power transmitted. In other words, as the crank-pin travels upwardly and to the right, in Fig. 1, the point of pitch line engagement of the teeth of the internal gear with the teeth of the pinion will travel reversely downwardly and to the left at an equal speed, therefore, the distance of the crank-pin from the fulcrum of the lever (the roller 6) will always be equal to the distance of said point of intermeshing contact from said fulcrum.

This movement provides a crank and lever transmitting mechanism having a constant ratio of leverage and transmitting rotary motion at equal speeds in the same direction.

For the purpose of amplifying the importance of the two to one gear ratio and of the coincident effective lengths of the weight and resistance ends of the lever, it will be pointed out that with any other gear ratio or lever ratio an internal gear of true circular form will not be maintained in correct mesh with the gear pinion and to then make the device operative the internal gear or the pinion would have to be of a distorted oval or elliptic shape, the precise shape and degree of distortion depending upon the amount of change made, from the form of the present invention.

I claim:

1. In a mechanical movement, a crank shaft having a crank pin, a stationary fulcrum, a lever of the first order connected to the crank pin and slidable relative to the fulcrum, the opposite end of the lever formed to provide a true circular internal gear, a second shaft, and a gear pinion on said second shaft meshing with the internal gear, the ratio of the internal gear and gear pinion being two to one and the pitch diameter of the pinion being equal to the throw of the crank pin.

2. In a mechanical movement, a crank shaft having a crank pin, a second shaft, a stationary fulcrum positioned intermediate of and equidistant from each shaft, a gear pinion carried by the second shaft, a crank pin carried by the crank shaft, and a lever of the first order connected at one end to the crank pin and slidable relative to the fulcrum, and having formed at the opposite end an internal gear meshing with the gear pinion, the ratio of the internal gear and the pinion being two to one and the pitch diameter of the gear pinion being equal to the throw of the crank pin.

3. In a mechanical movement, two relatively spaced shafts, a stationary fulcrum intermediate and equidistant from each shaft, a crank pin carried by one shaft, a gear pinion carried by the second shaft, the pitch diameter of said pinion being equal to the throw of the crank pin, and a lever of the first order slidably engaging the fulcrum and connected to the crank pin, the opposite end of the lever formed to provide a true circular gear meshing with the gear pinion, the ratio of the internal gear and the gear pinion being two to one and the effective lengths of the power and resistance ends of the lever being equal at all positions.

4. A mechanical movement comprising a crank shaft having a crank pin, a second shaft having a gear pinion of a pitch diameter equal to the throw of the crank pin, a stationary fulcrum intermediate said shafts positioned equidistant from each shaft, and a lever of the first order slidably engaging the fulcrum, one end being connected to the crank pin and the other end being formed to provide a true circular internal gear meshing with the gear pinion, with the effective lengths of both ends of the lever being equal at all times.

5. A mechanical movement comprising a crank shaft having a crank pin, a second shaft having a gear pinion of a pitch diameter equal to the throw of the crank pin, a stationary fulcrum, and a lever of the first order slidably engaging the fulcrum and connected to the crank pin, the opposite end being formed to provide an internal gear meshing with the gear pinion, the effective lengths of both ends of the lever being equal at all positions, the fulcrum being positioned half way between the two shafts and the gear ratio being two for the internal gear to one for the gear pinion, to transmit rotary motion of one shaft to rotary motion of the second shaft in the same direction and at equal speed and to maintain an even distribution of the transmitted power.

6. A mechanical movement combining a crank shaft, a stationary fulcrum, a lever of the first order slidably engaging the fulcrum and pivotally journaled on the crank pin of the crank shaft, the opposite end of the lever formed to provide a true circular internal gear, and a gear pinion meshing with the internal gear, the ratio of the internal gear to the gear pinion being two to one.

7. A mechanical movement combining a crank shaft, a stationary fulcrum, a lever of the first order slidably engaging the fulcrum and pivotally journaled on the crank pin of the crank shaft, the opposite end of the lever formed to provide an internal gear, and a gear pinion meshing with the internal gear.

Signed at Los Angeles, California, this 30th day of April, 1920.

PAUL PALÉ.

Witnesses:
CLARENCE B. FOSTER,
L. BELLE WEAVER.